Patented Aug. 23, 1927.

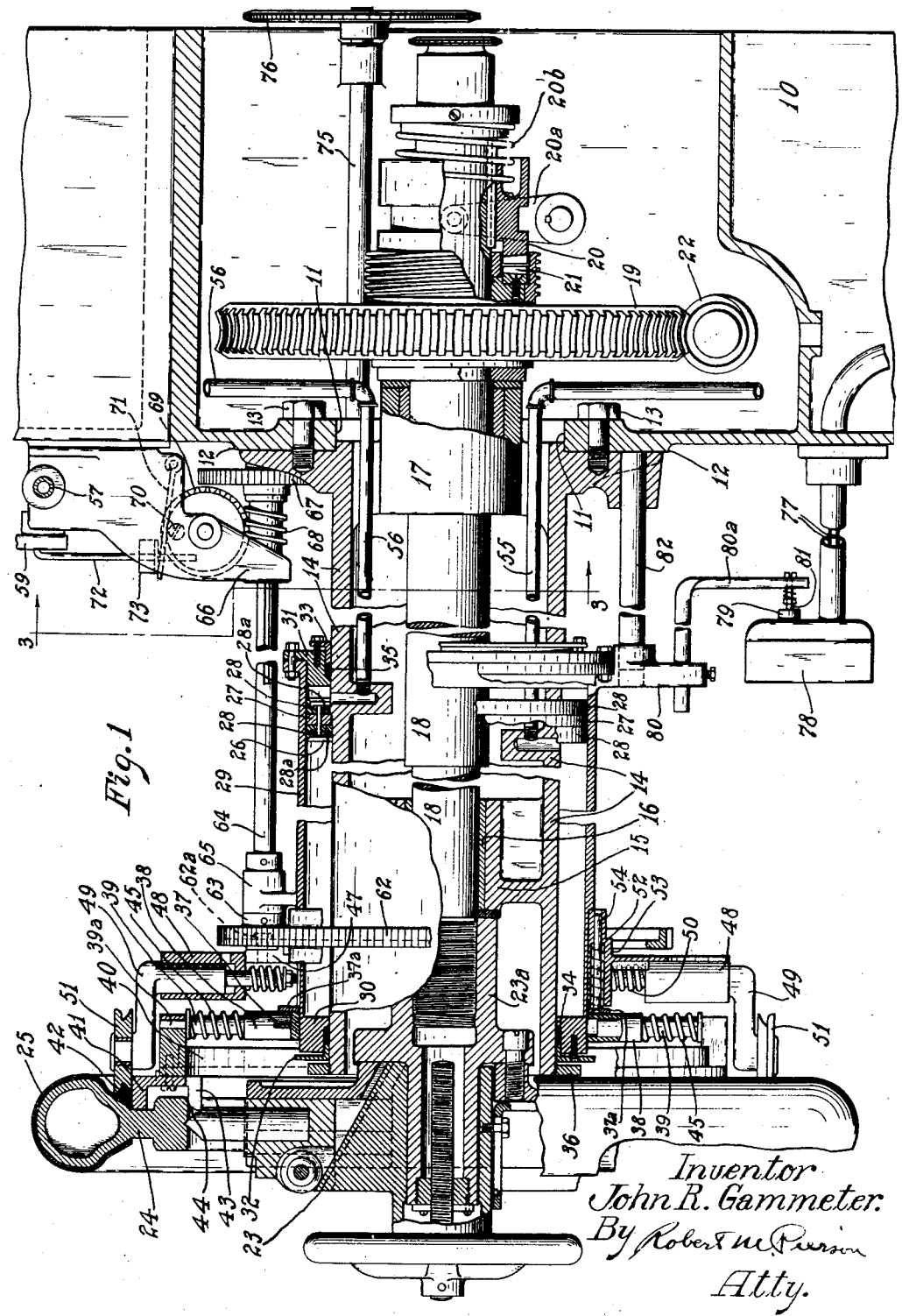

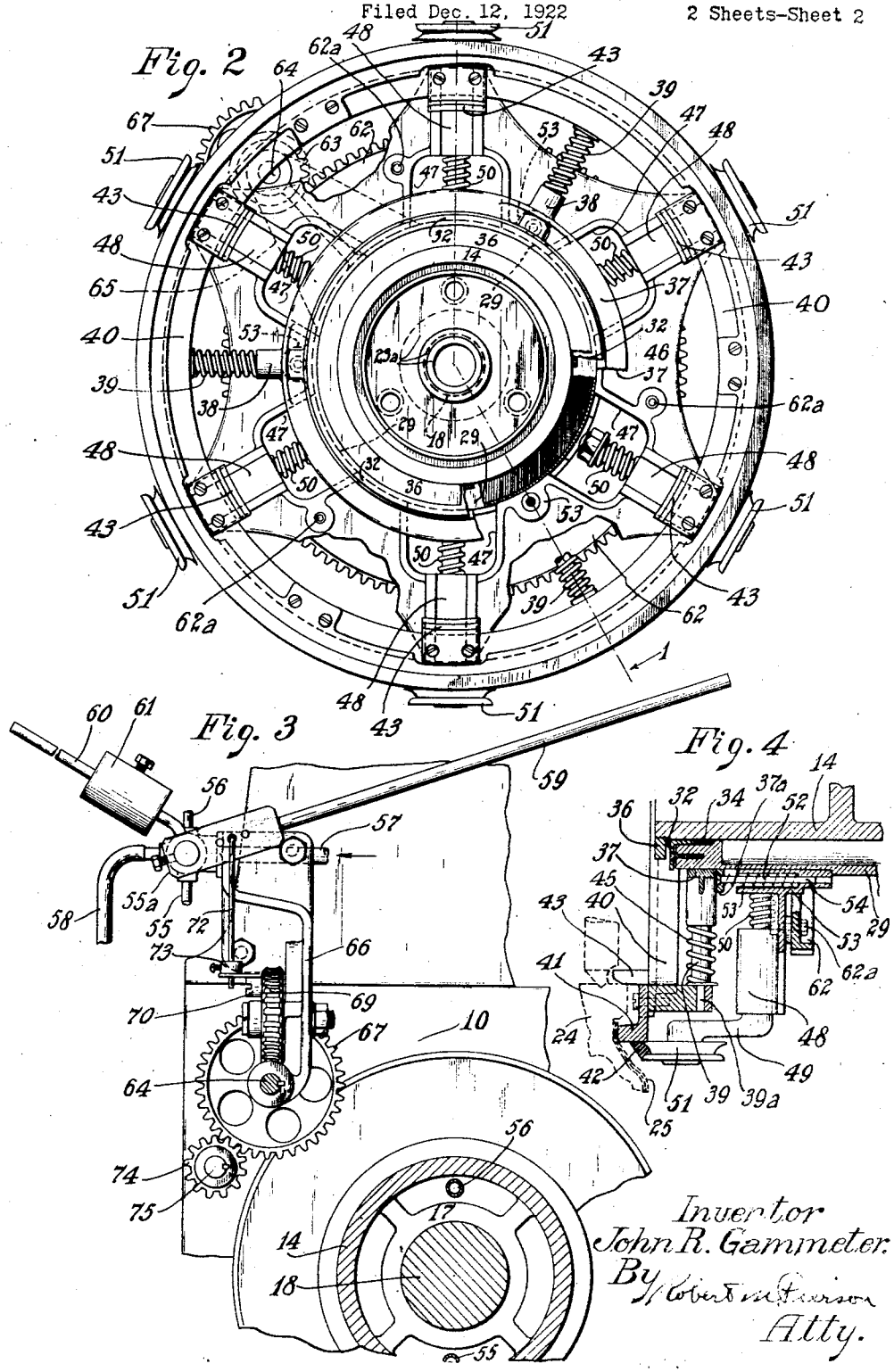

1,640,072

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-BUILDING APPARATUS.

Application filed December 12, 1922. Serial No. 606,382.

This invention relates to tire-building apparatus and especially to apparatus for placing or incorporating bead members in pneumatic tires. In the building of such tires it is of great importance that the bead member be presented to the partially built tire in a position exactly concentric therewith, since the tacky condition of the tire-building materials is such as practically to prohibit the adjustment of the bead member after it has come in contact with the plies of the tire against which it is placed, and it is also important that the bead member be adhesively pressed against said plies while held in true circular form. Where, as in common practice, the tire is built upon a core revolvably supported upon an overhanging support or chuck, a problem has been encountered in the accurate and rapid placing of the bead on the rear side of the tire, which is to say the side from which the chuck is supported, since the bead is preferably passed over the chuck before the core is mounted thereon and the chuck support is in the way of an operator in finally placing the bead by hand.

My chief object is to provide improved tire-building apparatus and particularly bead placing apparatus adapted for rapid and accurate operation, and a more specific object is to provide efficient, accurate and largely automatic means for placing the rear bead.

Of the accompanying drawings:

Fig. 1 is an elevation, with parts broken away and parts in section, of a portion of a tire-building machine embodying a preferred form of my invention, with the work in place, the bead-manipulating portions of the apparatus being sectioned on line 1—1 of Fig. 2, but with parts in different relative angular positions from those shown in Fig. 2.

Fig. 2 is an elevation of the apparatus, from the left of Fig. 1, with the tire-supporting chuck removed and with parts broken away.

Fig. 3 is a section on the line 3—3 of Fig. 1, showing in elevation the timing mechanism for actuating the bead placing apparatus.

Fig. 4 is a fragmentary section of a part of the bead placing apparatus, showing the parts at a certain stage of their operation.

Referring to the drawings, 10 is an upright casting or hollow standard formed at one side with an opening 11 surrounded by a boss 12 to which is secured by screw bolts 13, 13 a hollow, horizontally projecting, generally cylindrical casting 14, internally formed, near its outer end, with a partition-like structure 15 having a bearing with a bushing 16 therein, substantially coaxial with the casting 14. Mounted in said bearing and in a similar bearing 17 in the rear end of the casting 14 is a shaft 18, adapted to be driven by a worm-gear 19 rotatably mounted on said shaft between the rear bearing 17 and a jaw-clutch member 20, provided with a shipper fork 20$^a$, and a backing spring 20$^b$, said clutch member being splined on the rear portion of said shaft and being adapted to engage a jaw-clutch member 21 secured in the hub of said worm gear, the latter being adapted to be continuously driven by a worm 22 journaled in the standard 10 and connected with a suitable source of power, not shown.

Threaded onto the front end of the shaft 18 is the supporting hub 23$^a$ of a tire-cord chuck 23, which may be of any suitable construction but preferably, as here shown, is of the type shown and described in U. S. Patent No. 1,285,928 of November 26, 1918, to J. L. Butler. 24 is a tire core mounted on said chuck and having thereon a partly built tire carcass 25.

The casting 14 is finished with a smooth cylindrical outer surface, being thus adapted to act as a stationary piston rod and near its middle is secured thereon an annular structure 26 including an annular support 27 to each side of which is secured annular packing rings 28, 28 held thereon by retaining plates 28$^a$, 28$^a$, said structure constituting a stationary piston, upon which is mounted a cylinder 29 provided at its respective ends with annular members 30, 31 fitting the casting 14 and L-shaped, annular, clamping members 32, 33 secured thereto by screws, to retain annular packings 34, 35 within the members 30, 31, the members 30, 31 thus constituting cylinder-heads for the cylinder 29. 36 is an annular stop member threaded onto the outer end of the casting 14 to limit the forward movement of the cylinder 29.

Slidably mounted upon the outer end of the cylinder 29 is a ring or bead-support mounting 37 formed with three sleeves 38, 38 projecting radially outward therefrom, and slidably mounted in said sleeves respectively are the inwardly projecting portions of elbowed arms 39, 39 secured to an annular member 40, the latter having secured to its front face a bead-supporting ring 41 having a cylindrical outer face adapted to receive and support an annular tire-bead 42. Also secured to the front face of the annular member 40, at intervals, are positioning brackets 43, 43 having sloping faces such as is shown at 44 in Fig. 1, said brackets thus being adapted, by engagement with the inner periphery of the core 24, to guide the bead-supporting ring 41 into exact concentric relation with said core as the bead-supporting ring is presented thereto, helical compression springs 45, 45 being mounted respectively on the arms 39, between the elbows of the latter and the sleeves 38 so as to hold the bead-supporting ring, somewhat yieldingly, in substantially such concentric position as it approaches the core and before its positioning brackets 43 engage the core. The arms 39 are shown as being formed in two pieces, tenoned together, at 39ª, for convenience in substituting bead supporting rings for tires of different sizes.

Journaled upon the cylinder 29 back of the structure just described is a webbed, spider-member 46 formed with arched openings 47 extending laterally through it and with portions projecting radially outward from each of said openings. Each of said portions is radially bored from its extremity to provide a cylindrical socket 48, in which is splined an elbowed arm 49 having a reduced inner end portion slidably extending through an aperture in the floor of said socket and having mounted thereon a helical compression spring 50 interposed between the exterior end face of said socket and a nut on the end of said reduced portion, said elbowed arm 49 thus being yieldingly urged radially inward, and prevented from turning, in the socket. The outer end portion of each arm 49 extends toward the bead-supporting ring 41 and has loosely journaled at its extremity, on an axis radial with respect to said bead-supporting ring, a bead-pressing roller 51 having a working surface of such cross-sectional contour as to fit the bead 42, the inner, radial face of each of said bead-pressing rollers slidably resting upon the outer surface of the bead-supporting ring, under pressure of the spring 50 mounted upon the reduced inner end portion of the arm 49. Said rollers are thus adapted to run circumferentially around the bead-supporting ring, sliding the bead laterally thereon and pressing it against the partially built tire carcass.

To first present the bead-supporting ring 41 to the tire and then permit continued movement of the bead-pressing rollers toward the tire-core after the bead-supporting ring has been so presented to and stopped by the core, helical compression springs, one of which is shown at 52 in Fig. 1, are interposed between the spider member 46 and a ring 37ª slidably abutting the ring 37, said spider member being formed with suitable spring sockets 53, 53 and the ring 37ª being provided with spring posts 54, 54, each of which extends into a guide aperture at the rear end of its spring-socket. The ring 37 is retained upon the cylinder 29, so as to be compelled to recede therewith from the core, by the L-shaped, annular member 32.

For driving the cylinder 29 forward and backward respectively, upon its stationary piston 26, a pressure-fluid pipe 55 leads from a four-way control valve 55ª (shown most clearly in Fig. 3), through the interior of the casting 14 and into the front end of the cylinder 29, and a similar pipe 56 leads from said valve to the rear end of said cylinder. Said valve is provided with an inlet, fluid-supply pipe 57, leading from a source of pressure fluid such as a compressed air tank (not shown), an exhaust pipe 58, and a hand-operable control lever 59, and on the hub of the latter is mounted a lever 60 provided with an over-center weight 61 adapted to hold the valve in position either to charge the pipe 55 and exhaust the pipe 56 or vice versa.

For driving the spider-member 46 to run the rollers 51 about the bead-supporting ring 41, and so press the bead 42 against the tire-carcass, a gear-ring 62 is secured to said spider member by screw bolts 62ª, 62ª, and meshed with a pinion 63 secured to a shaft 64 journaled in a bracket 65 projecting laterally from the cylinder 29, and slidably journaled in a bracket 66 secured to the casting 10. The casting 10 is formed with an aperture (not shown) adapted to admit the rear end of the shaft. Said shaft is thus adapted to move forward and backward with the cylinder 29. Splined on said shaft between the bracket 66 and the casting 10 is a gear 67 having a hub portion formed with a worm 68, said worm being meshed with a worm-gear 69 journaled on the bracket 66 and provided with a laterally projecting stud 70 adapted at each revolution of the worm-gear 69 to lift a lever 71 pivoted on said bracket. A link 72 is hinged to the hand lever 59, projects downward with a loose fit through an aperture in the lever 71 and is provided with an adjustable collar 73 adapted to be engaged by the lever 71, the stud 70 being thus adapted, at each revolution of the worm gear 69, to lift the weight 61 over center to throw the control valve 55$^a$ into position to retract the cylinder 29 and parts carried thereby from the tire-core, the valve being then held in such position by the over-center weight while the lever 71 further departs from the collar 73.

For driving the shaft 64, and thereby driving the bead-pressing rollers 51, a pinion 74, meshed with the gear 67, is secured to a shaft 75 journaled in the casing 10 and provided at its rear end with a sprocket 76, said sprocket being adapted to be driven by a motor and a sprocket-chain therefrom (not shown). 77, 77 are electric wires leading to the motor from a normally open switch 78 provided with a spring-backed push button 79. Adjustably secured in a bracket 80 projecting from the lower part of the cylinder 29 is an arm 80$^a$ provided with a spring-backed stud 81 adapted to contact said push-button and thereby close said switch to start the motor when the cylinder and parts thereby closely approach the limit of their movement toward the tire-core. 82 is a guide bar projecting from the casing 10 and slidably mounted in the bracket 80, being thereby adapted to assist in preventing rotation of the cylinder 29.

In the operation of the apparatus, the over-center weight 61 and the hand lever 59 being in the positions shown in Fig. 3 and the cylinder 29 and parts thereby consequently being retracted from the chuck 23, the tire-bead 42, for the rear side of the tire to be built, is passed over the overhanging chuck 23, preferably before the tire-core is mounted upon the chuck, and mounted upon the bead-supporting ring 41 adjacent the bead-pressing rollers 51, the latter overlapping said ring only a little way, from the rear, due to the separation of the bead supporting ring 41 and the spider-member 46 by the springs 52. The core 24 is then mounted upon the chuck, and the under-bead plies 25 of a tire carcass are built upon the core in any known or suitable manner, for which purpose the chuck may be driven, through the gear 19 and clutch 21, 20, while the bead placing apparatus remains retracted and inactive.

When the carcass is partially built as shown, and is ready for the bead, the operator pulls down the hand lever 59, the over-center weight 61 then continuing to hold it down, and thus charges the front end of the cylinder 29, driving forward the latter, with the bead placing mechanism thereon, the shaft 64 sliding in the gear 67 splined thereon. As the cylinder approaches the core the positioning brackets 43 slidingly engage the inner periphery of the core, accurately positioning the bead-supporting ring 41 with relation to the core and the partially built tire thereon, just before the movement of said ring is stopped by contact with the tongue of the core. The spider member 46 continues to be carried forward with the cylinder 29, compressing the springs 52, and at approximately the time when the bead-supporting ring is stopped, the stud 81 on the arm 80$^a$ contacts the push-button 79 and starts the motor, which, through the sprocket 76, gear 62, and intermediate driving members above described drives the spider member 46, running the bead-pressing rollers 51 circumferentially around the bead-supporting ring, longitudinally of the bead, while they continue to move toward the tire-core and slide the bead laterally on said ring and press it in place against the partially built tire carcass 25.

Meanwhile the worm gear 69 is slowly driven by the worm 68, completing one revolution when the bead-pressing rollers have finished their work, at which time the stud 70 on said worm gear, reaching the upper part of its orbit, lifts the lever 71 and thereby forces the weight 61 over center, the control valve 55$^a$ thereby being operated to exhaust the front end and charge the rear end of the cylinder 29. Said cylinder and the parts mounted thereon are thereby retracted from the tire-core, and as they move backward the stud 81 leaves the push-button 79, turning off the motor and so stopping the drive of the bead-placing apparatus. The retaining member 32 on the front end of the cylinder contacts the ring 37 and so compels the bead-supporting ring to withdraw from the tire-core, leaving the bead 42 in place upon the partially built tire carcass, while the springs 52 hold the bead-supporting structure away from the spider-member 46, in position to receive the next bead. Hand operated apparatus having bead-engaging parts similar to those above described may be used for placing the opposite bead of the tire, after which the building of the tire is completed, the core with the tire thereon removed from the apparatus, and the operation repeated.

The bead placing apparatus being slidably mounted, and the bead supporting and pressing mechanism being adapted to position itself with respect to the core, the bead may be very accurately placed. Separate members being employed for supporting the bead and for pressing it against the tire, the bead may be presented in true circular form, and pressed into place by rolling pressure, whereby good adhesion is obtained. The placing and rolling of the bead is substantially automatic, the operator being required only to place the bead upon the ring 41 and operate the control lever 59 once for each cycle of operations.

I claim:

1. Bead placing apparatus comprising means for presenting a bead to a partially constructed tire while holding the bead in circular form by engagement with its inner periphery, a bead-pressing roller, means for relatively running said roller longitudinally of the bead to press said bead against said tire while the bead remains upon the presenting means, and means operatively connecting the bead-presenting means and the bead-pressing roller to actuate them in timed relation.

2. Bead placing apparatus comprising a structure adapted to support the bead in circular form by engagement with the inner periphery of the latter, a bead-pressing roller, and means mounted coaxially and rotatable with relation to the said bead-supporting structure for running said roller longitudinally of a bead while the bead remains mounted on said structure to press said bead against a tire structure.

3. Bead placing apparatus comprising a bead-supporting structure, a mounting journaled concentrically with relation to said structure, a bead-pressing roller journaled on said mounting and adapted to run longitudinally of a bead mounted on said structure, and yielding means urging said structure and said mounting apart in an axial direction but adapted to be overcome to permit said roller to force said bead laterally of said bead-supporting structure.

4. In combination with a tire-core and means for supporting the same, bead-placing apparatus comprising a bead-supporting structure adapted to be presented to said core, means on said structure for centering it with respect to the core as it is so presented, a bead-pressing roller, and means for running said roller longitudinally of a bead mounted on said structure to press said bead against a tire-structure on said core.

5. In combination with a tire-core and means for supporting the same, bead-placing apparatus comprising a bead-supporting ring having a cylindrical outer surface and adapted to be presented to said tire-core, a bead-pressing roller journaled on an axis radial with respect to said ring and adapted to be run longitudinally of a bead mounted thereon to press said bead, and means for yieldingly holding said roller against the outer face of said bead-supporting ring as it is so run.

6. In combination with a tire-core and means for supporting the same, bead placing apparatus comprising an annular bead-support mounting adapted to be moved into a position adjacent said core, a bead support mounted on said bead-support mounting, yielding means interposed operatively between said bead support mounting and said bead-support and adapted to permit the latter to shift the position of its axis with relation to that of said bead-support mounting, and means on said bead-support for centering it with relation to said core as it is presented to the latter.

7. In combination with a tire-core and means for supporting the same, bead placing apparatus comprising a bead-support slidably mounted adjacent said core and adapted to be moved axially of the core to present it to the latter, a slidably mounted roller-supporting structure adapted to follow said bead-support, and a bead-pressing roller journaled on said roller-supporting structure and adapted to be run longitudinally of a bead mounted on said bead-support, the latter and said roller-supporting structure being adapted for relative rotary movement and relative axial, sliding movement.

8. Bead-placing apparatus comprising a bead-supporting structure formed with a cylindrical outer face adapted to fit within the bead to hold the latter in true circular form, the said face being of greater dimension than the bead in an axial direction, means for guiding said structure axially of a tire core to present a bead on said structure to a partially-built tire on the core, and means mounted for determinate movement toward the core with relation to the said structure and adapted to contact the bead at a plurality of circumferential positions and at the same time to slide the bead on said structure into contact with the partially-built tire.

9. Bead placing apparatus comprising a structure adapted to support the bead by engagement with the inner periphery of the latter, a bead-pressing structure mounted to slide axially of said bead supporting structure to press the bead against the tire, and yielding means for urging said structures axially apart.

10. In combination with a tire-core and means for supporting the same, bead-placing apparatus comprising a bead-support slidably mounted adjacent said core and adapted to be moved axially of the core to present it to the latter, a slidably mounted bead-pressing structure adapted to follow said bead-support, said bead-support and said bead-pressing structure being adapted for relative sliding movement.

11. In combination with a tire-core and a projecting shaft for supporting the same, tire-working apparatus comprising an annular piston surrounding said shaft, a cylinder surrounding said shaft and coacting with said piston, and a tire-building tool mounted to slide axially of said shaft and to be so actuated by said piston and cylinder.

12. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, and a tire-building tool mounted on said cylinder.

13. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, an annular bead support mounted on said cylinder, a roller support mounted on said cylinder, said bead-support and said roller-support being adapted for relative rotary movement, and a roller journaled on said roller-support and adapted to run longitudinally of a bead mounted on said bead-support.

14. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, an annular bead supporting structure slidably mounted on the front part of said cylinder, a roller-supporting structure rotatably mounted at a fixed location on said cylinder, back of said bead supporting structure, a roller journaled on said roller supporting structure and adapted to press a bead mounted on said bead-supporting structure, yielding means adapted to urge said bead-supporting structure and said roller-supporting structure apart, and means for driving said roller supporting structure.

15. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, tire-working tools mounted on said cylinder, means for driving said tools, and a contact member mounted on said cylinder and adapted to maintain said driving means in operation when said cylinder is in its advanced position, adjacent said tire core.

16. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, tire-working tools mounted on said cylinder, means for driving said tools, and means associated with said driving means for reversing said cylinder at a determinate stage in the operation of said driving means.

17. In combination with a tire-core and a projecting shaft for supporting the same, tire-working apparatus comprising a stationary, projecting member surrounding said shaft and constituting a piston rod, a stationary piston mounted thereon, a cylinder mounted on said piston and piston rod, means for supplying pressure fluid to each end of said cylinder while exhausting the other, tire-working tools mounted on said cylinder, means for driving said tools, a contact member mounted on said cylinder and adapted to maintain said driving means in operation when said cylinder is in advanced position, adjacent said core, and means associated with said driving means for reversing said cylinder at a determinate stage in the operation of said driving means.

18. In combination with a tire-core and a projecting shaft for supporting the same, bead-placing apparatus comprising a bead-supporting ring surrounding said shaft and adapted to be slid axially thereof, a roller support mounted for axial sliding movement with relation to said shaft, a bead-pressing roller journaled on said roller support and adapted to run longitudinally of a bead mounted on said bead support, and means for forcing said bead-support and said roller support axially of said shaft toward said core.

19. Tire-building apparatus comprising a tire core, an overhanging structure constituting a mounting for said tire-core, a tool-support mounted on said structure to slide axially thereof, a tire-building tool rotatably mounted on said tool support, means for sliding said tool-support from and toward said tire core, and gearing connected to said tool for rotating it with relation to said structure.

20. In combination with a tire-core and a projecting shaft for supporting the same, bead placing apparatus comprising means for supporting an annular bead in concentric relation to said shaft, said means being slidably mounted for axial movement with relation to said shaft, a fluid-pressure cylinder surrounding said shaft, and means actuated by said cylinder for pressing said bead.

21. Tire building apparatus comprising means for supporting a tire-core, a tire-core thereon, a tool mounting slidably mounted for movement axially of said core, from and toward the latter, a tire-tool rotatably mounted on said tool mounting, means for driving said tool, means for moving said mounting from and toward said core, means actuated by the movement of said mounting, toward the core for starting the tool-driving means, and means timed with said tool driving means for actuating the driving means of said mounting to retract the latter from the core.

In witness whereof I have hereunto set my hand this 9th day of December, 1922.

JOHN R. GAMMETER.